(12) United States Patent
Reed

(10) Patent No.: US 8,476,547 B1
(45) Date of Patent: Jul. 2, 2013

(54) WIRE ELECTRIC DISCHARGE MACHINE

(76) Inventor: Daniel J. Reed, Pleasant Plain, OH (US)

(*) Notice: Subject to any disclaimer, the term of this patent is extended or adjusted under 35 U.S.C. 154(b) by 239 days.

(21) Appl. No.: 12/927,334

(22) Filed: Nov. 12, 2010

(51) Int. Cl.
*B23H 7/02* (2006.01)

(52) U.S. Cl.
USPC ........................................ 219/69.12

(58) Field of Classification Search
USPC ............................. 219/69.11, 69.12; 700/162
See application file for complete search history.

(56) References Cited

U.S. PATENT DOCUMENTS

| | | | |
|---|---|---|---|
| 5,181,177 A * | 1/1993 | Bond et al. ............. | 219/69.17 |
| 5,762,543 A | 6/1998 | Kasprzyk et al. | |
| 6,120,358 A * | 9/2000 | Porter .................... | 451/57 |
| 6,549,824 B1 * | 4/2003 | Satou et al. ............ | 700/162 |
| 6,888,087 B2 | 5/2005 | Takeyama | |
| 6,903,297 B2 | 6/2005 | Goto et al. | |
| 6,998,562 B2 | 2/2006 | Arakawa et al. | |
| 7,078,645 B2 | 7/2006 | Yamada et al. | |
| 7,084,381 B2 | 8/2006 | Davids et al. | |
| 7,211,762 B2 | 5/2007 | Kinoshita et al. | |
| 7,774,087 B2 | 8/2010 | Lin et al. | |
| 2002/0020611 A1 * | 2/2002 | Regazzoni ............. | 198/793 |
| 2003/0080100 A1 * | 5/2003 | Yamazaki et al. ...... | 219/121.82 |

FOREIGN PATENT DOCUMENTS

| | | | |
|---|---|---|---|
| JP | 61-192416 A | * | 8/1986 |
| JP | 2-65923 A | * | 3/1990 |

* cited by examiner

*Primary Examiner* — Geoffrey S Evans
(74) *Attorney, Agent, or Firm* — Mark F. Smith; Smith Brandenburg Ltd.

(57) ABSTRACT

A wire electric discharge machine (WEDM) and method of cutting a work piece. The WEDM having a movable support plate for supporting one or more work pieces thereon and for moving one or more work pieces into the proper position for a cutting operation. Process information is recorded and compared to predetermined operating parameters and tolerances to determine deviations therefrom and adjustments are automatically made to the cutting operation to correct such deviations.

9 Claims, 9 Drawing Sheets

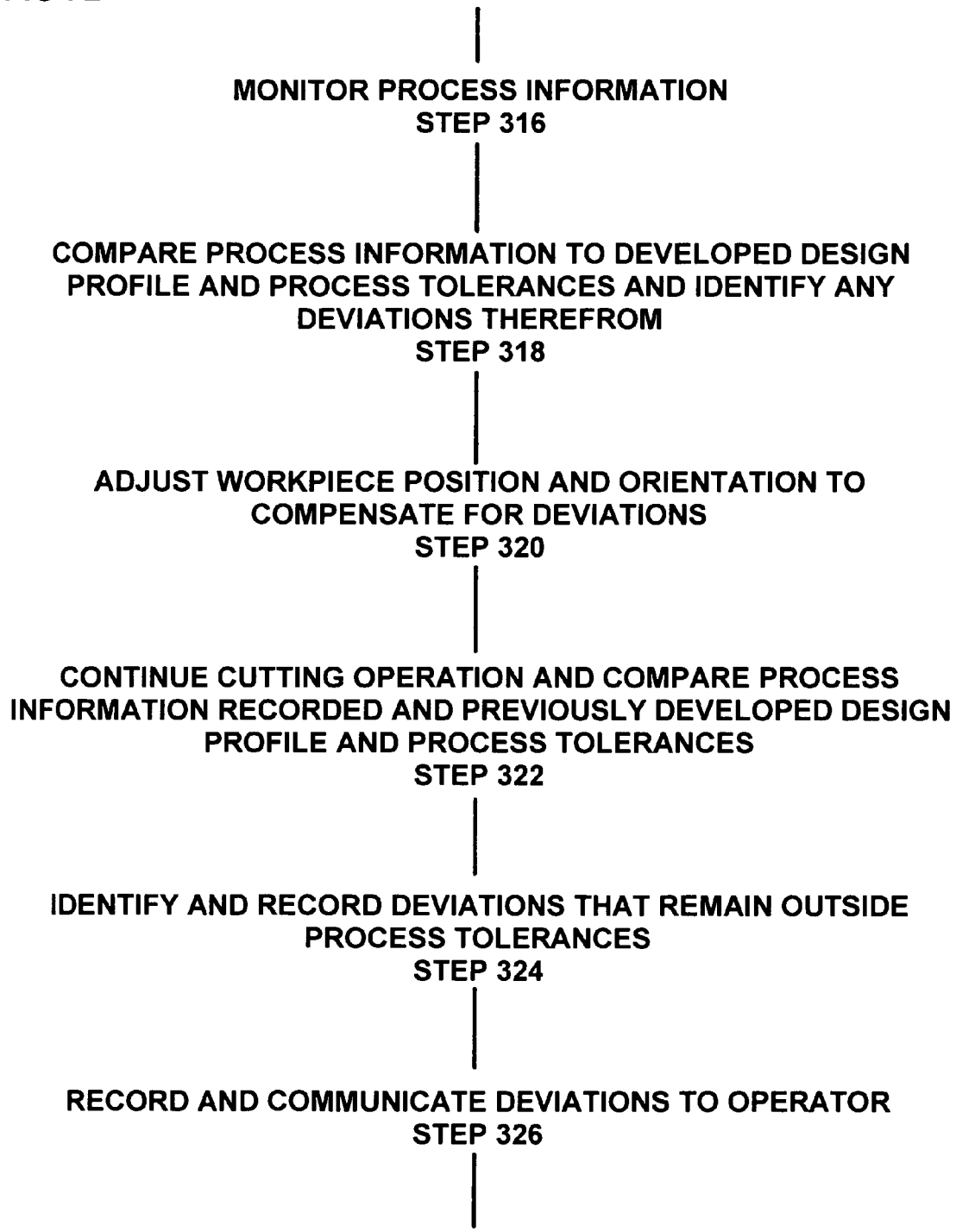

WIRE ELECTRIC DISCHARGE MACHINE

BACKGROUND OF THE INVENTION

The present invention relates to a new and novel electric discharge machine whereby a work piece can be shaped by the use of rapidly recurring electrical discharges between two electrodes, separated by a dielectric liquid and subject to an electric voltage, and more particularly to a wire electric discharge machine.

One form of a electric discharge machine is known as a wire electric discharge machine often used to cut plates, make tools and dies, utilizes and uses a continuous thin single-strand metal wire held between first and second wire guides and used as an electrode and fed through the work piece. Wire is constantly fed and held between upper and lower guides. The guides move in the x-y plane and the upper guide can typically pivot in one or more axis thereby allowing parts to be cut having a taper or cut into various geometric shapes.

Unfortunately, while many intricate and delicate shapes can be cut using a wire electric discharge machine, certain shapes that require the cutting of thin wall tubing at high precision remain difficult and time consuming. Further, many parts are relatively small and requires an operator to be constantly monitoring the cutting process so that once one part is complete it is removed and a new part is placed in position for processing. This constant monitoring of the process by an operator is relatively expensive and time consuming and also requires close monitoring of the process by a machinist to assure the wheel does not wear or break-down during use and to ensure that process parameters are maintained.

In wire electrical discharge machining operations, the machinist sets a work piece onto a stand such that the work piece is in proper position for cutting. This requires the machinist to precisely place the work piece in position. Failure to properly place the work piece in the proper position will often result in a part being manufacture outside of the specification for the part thus requiring the work piece to be re-cut or scrapped.

Accordingly, a need exists for a electrical discharge machine, and more particularly, a wire electrical discharge machine that can be used to cut intricate and delicate shapes, including cutting shapes involving thin wall tubing, that is relatively inexpensive and time efficient, that does not require the machinist to precisely place the work piece in position for cutting, and that minimizes the need for close monitoring of the cutting process.

SUMMARY OF THE INVENTION

The present invention is a new and novel wire electrical discharge machine (WEDM) having a metal wire electrode held between a first guide and a second guide, and a movable support plate for supporting at least one work piece. The WEDM further includes a cutting control unit, such as a computer numeric control (CNC) or other similar computerized or automatic control, for controlling the cutting process and the support plate relative to the wire electrode wire such that the work piece can moved with respect to the wire electrode.

In a preferred embodiment of the invention, the support plate is supported by a shaft for raising and lowering the support plate relative to the wire electrode.

In another preferred embodiment of the invention, the support plate is supported by a shaft which can pivoted for tilting the support plate relative to the wire electrode.

In another preferred embodiment of the invention, the support plate operates to move the work piece during the cutting process.

In another preferred embodiment of the invention, the wire electrical discharge machine includes one or more sensors for quality control and process monitoring.

In another preferred embodiment of the invention, the sensors are electronically linked to the computer control unit and relays process information to a monitoring station.

In another preferred embodiment of the invention, process information includes the position and orientation of the work piece relative to the wire electrode.

In another preferred embodiment of the invention, process information includes cutting information including depth, length, and position of the cuts.

In another preferred embodiment of the invention, the process information compares the cutting information to derived specifications.

In another preferred embodiment of the invention, the computer control unit operates to rotate the support plate such that a cut work piece is rotated out of position and a new work piece is rotated into position for cutting.

In another preferred embodiment of the invention, the computer control unit operates to rotate the support plate during the cutting process.

In operation, such as in a cutting operation, the output of each sensor is monitored in either interrupt driven or closed feedback loop mode at high speed during the cutting operation so that process information, such as the position and orientation of the work piece, the cutting depth, the length, and the location are recorded to file every few milliseconds. The file may be indexed by the serial number of the work piece and may contain additional information such as the time and date of processing, an identification of the specific equipment used, and the operator ID in addition to the recorded work piece and cutting information.

Following the operation, if the process information (cutting length, depth, etc.) have remained within the process tolerances of acceptable operating parameters, the operation is considered a success and the operator so notified. In the event that the process information falls outside of the predetermined process tolerances, a failure is noted directly on the machine operator's computer monitor and also written to the electronic file associated with the operation thereby permanently recording the failure.

In a preferred embodiment of the invention, the process information, as well as derived quantities such as the minimum, maximum, mean and standard deviation of both the process information, are continuously recorded to file during the operation.

In another preferred embodiment of the invention, data files containing process information are created for each work piece treated and named according to identifying indicia, such as a serial number, unique to that work piece.

In another preferred embodiment of the invention, the cutting process and equipment are remotely monitored and/or controlled.

The present invention offers a significant improvement over the previous technology in numerous respects. First, the present invention provides instantaneous, permanent and traceable documentation of the cutting process performed on the workpiece that is remotely accessible.

Another benefit of the invention is that it provides a diagnostic tool for maintenance of the apparatus so that deviation from normal equipment operation can be identified and remedied through the use of statistical process control and other means of analyzing the process data collected.

Another benefit of the invention is that intricate cuts forming intricate and complex shapes can be easily performed.

Another benefit of the invention is that work pieces can be automatically moved into position for cutting and automatically moved out of position or removed from the wire electrical discharge machine for additional processing.

BRIEF DESCRIPTION OF THE DRAWINGS

The above-identified benefits along with other features, aspects, advantages, and benefits of the present invention will become better understood with regard to the following description, appended claims, and accompanying drawings where:

FIGS. 7A, 7B and 7C is a flow diagram of another preferred embodiment of the invention showing the quality control and process monitoring method of the present invention.

DETAILED DESCRIPTION OF THE INVENTION

The present invention relates to a new and novel electrical discharge machine and more specifically to a wire electrical discharge machine (WEDM) having a support plate for placing a work piece into and out of position for cutting and having an active control system for monitoring the cutting process. In describing the preferred embodiments of the invention, specific terminology will be resorted to for the sake of clarity. However, the invention is not intended to be limited to the specific terms so selected, and it is to be understood that each specific term includes all technical equivalents that operate in a similar manner to accomplish a similar purpose.

For purposes of explanation, as used herein the terms "upward" or "upwardly" refers to the direction away from the base of the WEDM and the terms "downward" and "downwardly" refers to the direction towards the base of the WEDM.

Figure 1:
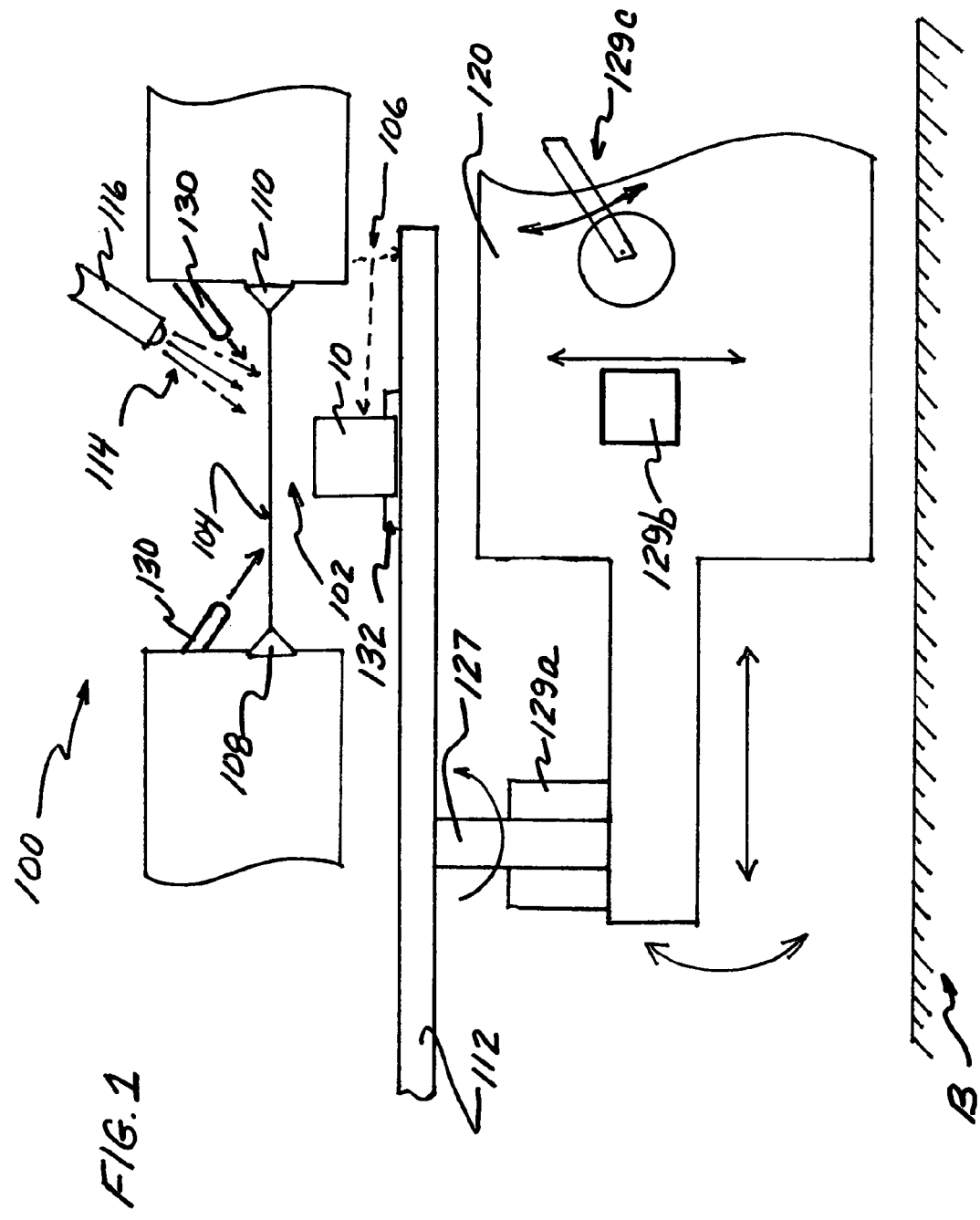
FIG. 1 is a schematic diagram of the wire electrical discharge machine of the present invention configured in accordance with this invention is shown having cutting wire electrode, a work piece electrode and a movable support plate for placing a work piece in position for processing.

Referring to FIG. 1, a wire electrical discharge machine (WEDM) 100 mounted on a conventional base B for machining a work piece 10 by generating electric discharge in a gap 102 between a wire electrode 104 fed from a supply reel (not shown) and a work piece electrode 106. A first wire guide 108, a second wire guide 110 is positioned such that the wire electrode 104 is positioned above the work piece 10 when the work piece 10 is in its proper position for processing. It should be understood that in another preferred embodiment of the invention the wire electrode can me mounted such that the wire electrode is passed through a drilled hole in the work piece and connected either by hand or automatically using a connection device such as know in the art. The WEDM 100 is further provided with a movable support plate 112 for supporting at least one work piece 10 thereon. Typically a machining fluid 114 is provided such as through one or more nozzles 116 and injected into the discharge gap 102. In operation, a work piece 10 is positioned such that the material of the work piece 10 at the discharge gap 102 is eroded by electric discharges that form an arc between the wire electrode 104 and the work piece 10. In a preferred embodiment of the invention, the movable support plate 112 is formed from an electrical conducting metal and the work piece 10 is positioned such that it is in electrical communication with the support plate 112. Accordingly, the work piece electrode 106 is electrically connected to the support plate 112. It should now be understood that by attaching the work piece electrode 106 to the support plate 112, eliminates the need for an operator to remove the work piece electrode 106 from a work piece 10 after processing and allows subsequent work pieces 10 to be moved into position for processing without the need of an operator attaching the work piece electrode 106 to the work piece currently being processed. It should also now be understood that eliminating the need of attaching the work piece electrode directly onto a work piece being processed significantly reduces the work and time for processing small parts such as parts often produced for medical devices using WEDM systems.

Figure 2:
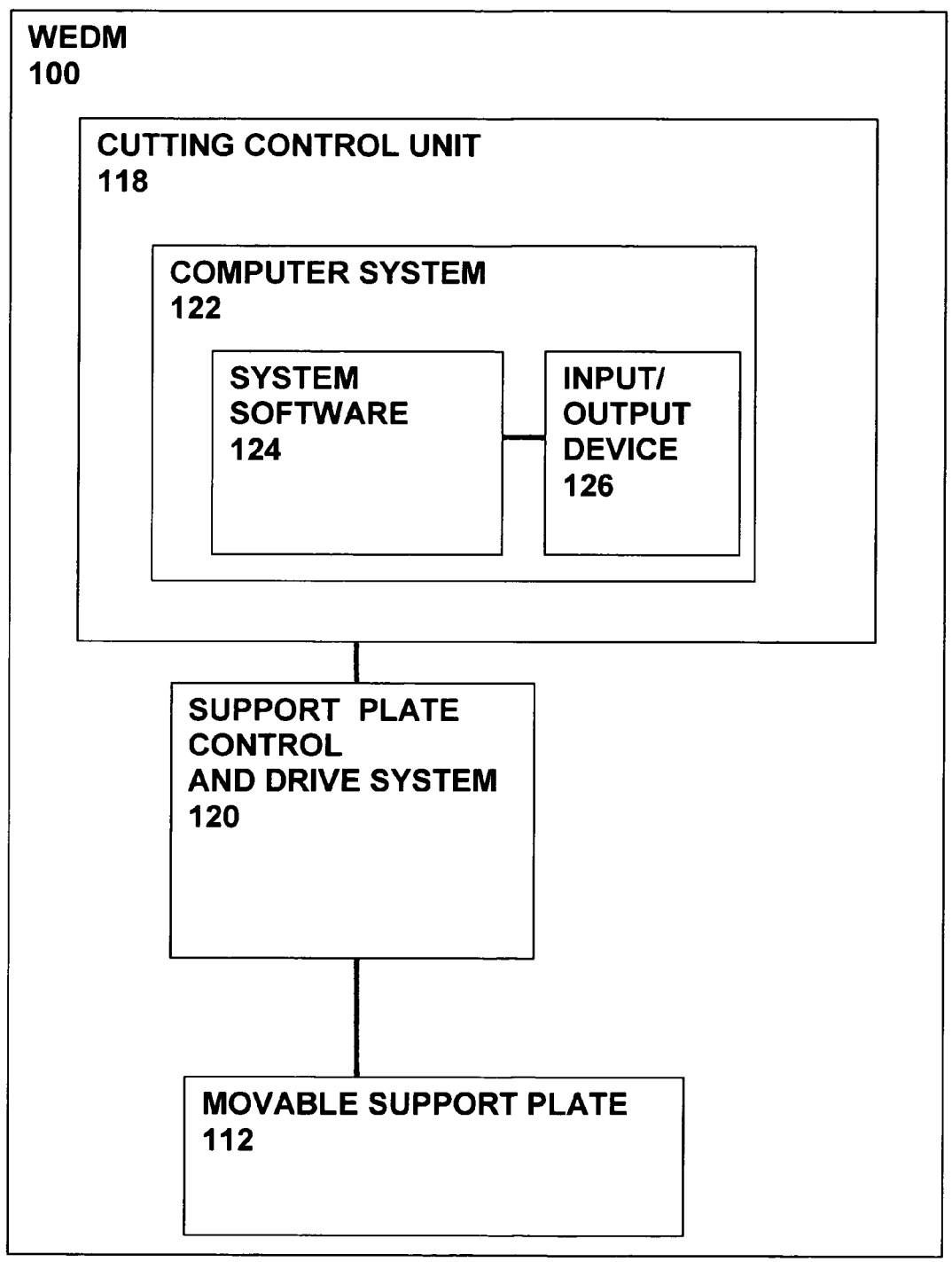
FIG. 2 is a schematic diagram of the wire electrical discharge machine of FIG. 1 showing the relationship between the cutting control unit, the support plate control and drive system and the movable support plate.

In a preferred embodiment of the invention, the WEDM 100 of the present invention is automatically operated such that cutting specifications can be determined and the WEDM operates to cut the work piece in accordance with the specification. As schematically illustrated in FIG. 2, the WEDM 100 can include a WEDM cutting control unit 118, such as a conventional numerical controller (CNC machine), computer, or other automatic systems, for controlling the operation of the WEDM 100 and cooperates with a support plate control and drive system 120 that operates to move the movable support plate 112 for placing the work piece 10 in proper placement for processing. In a preferred embodiment the WEDM cutting control unit 118 includes a computer system 122, or other similar microprocessor, for operating the system software 124. Preferably, the computer system 122 operates the system software 124 to direct the main processing steps, as described herein below, of the WEDM 100. The system software 124 is a computer-readable medium having computer-readable instructions for performing a method of operating the system to be displayed on the input/output devices 126 for use by individuals in inputting information into the computer system 122. It should be understood that as used herein, the term "software" refers to any form of programmed machine-readable language or instructions (e.g., object code) that, when loaded or otherwise installed, provides operating instructions to a machine capable of reading those instructions, such as a computer. The system software of the present invention can be stored or reside on, as well as be loaded or installed from, one or more floppy disks, CD ROM disks, hard disks or any other form of suitable non-volatile electronic storage media. The system software can also be installed by downloading or other form of remote transmission, such as by using Local or Wide Area Network (LAN or WAN)-based, Internet-based, web-based or other remote downloading or transmission methods. Preferably, the system software 124 operates as an interactive, menu and event driven system that cooperates with the computer system 122 for using conventional type of prompt, dialog, and entry windows to guide a user to enter information. Thus, the cutting control unit 118 provides an interactive communications interface for receiving and storing operating instructions, implementing the operating instructions and sending operational instructions to the support plate control unit for facilitating processing of the work piece 10.

Figure 3:
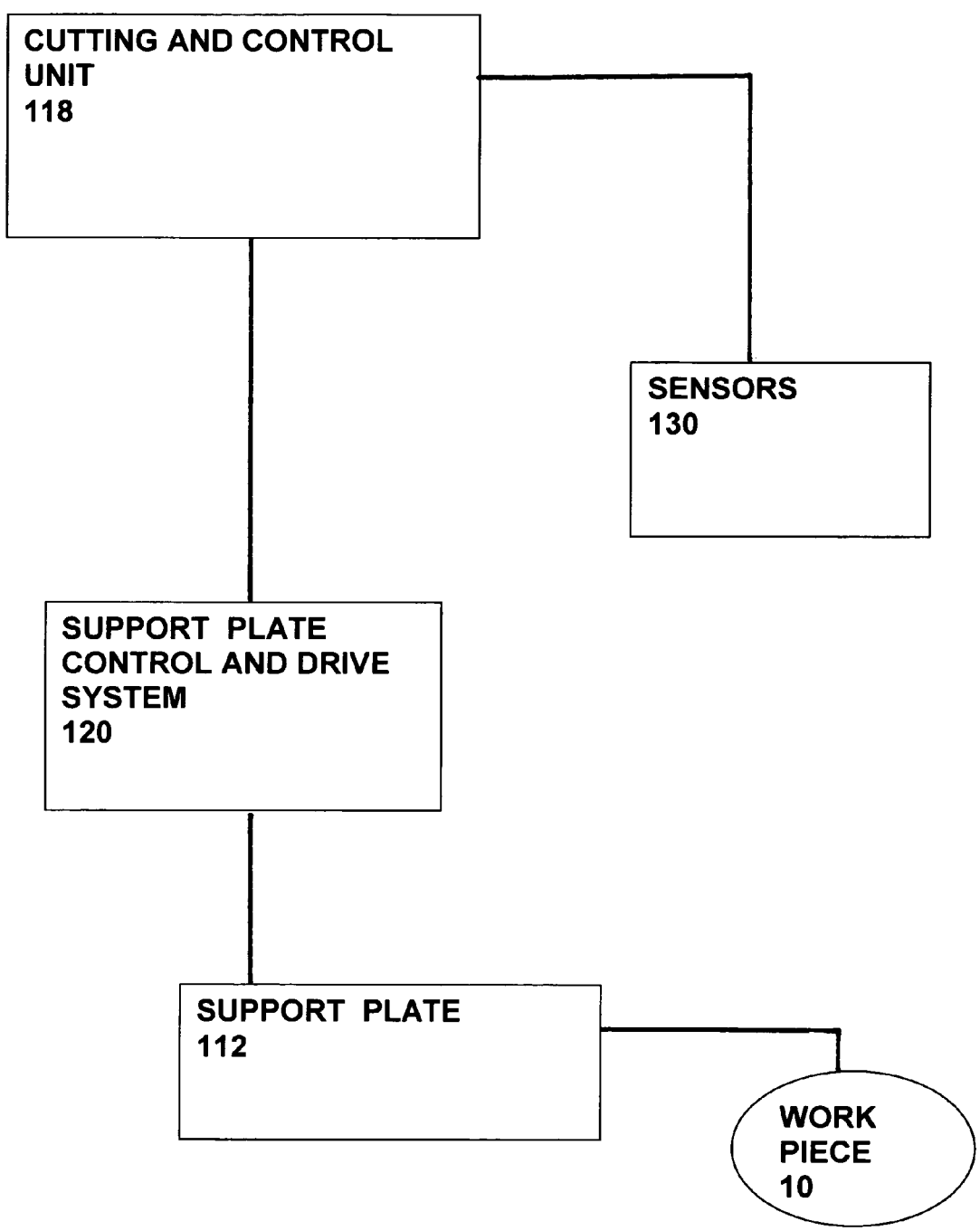
FIG. 3 is a schematic diagram of the electric discharge machine of FIG. 1 showing the relationship between the cutting and control unit coupled to the support plate control and drive system, the sensors, and the work piece being processed.

In one embodiment, as shown in FIG. 1, the support plate 112 is mounted to a shaft 127 that is mechanically coupled to the control and drive system 120 of the WEDM 100 of the present invention. Preferably the shaft 127 is rotatable such as by an electric servomechanism 129*a* to ensure accuracy. The support plate control and drive system 120 further includes other support structures having one or more position control servomechanism assemblies that conventionally operate together to raise or lower the shaft 127 upwardly or downwardly to lift or lower the support plate 112 (servomechanism 129*b*) such as by use of vertical rails (not shown) and/or to pitch the shaft 127 (servomechanism 129*c*) such that the support plate 112 can pitch forward or backward thereby tilting or inclining the work piece. Accordingly, it should be understood to one skilled in the art that the support plate 112 can be moved such that the work piece 10 positioned on the support plate 112 can be rotated, raised, lowered, or inclined (tilted) during the cutting process. The support plate control and drive system 120 is in operable communication with the cutting control unit 118 for positioning the work piece 10 with respect to the axis of rotation of the movable support plate 112 during operation of the WEDM 100. Referring to FIG. 3, sensors 130, selected from the list including, but not limited to, optical sensors, magnetic sensors, electromagnetic sensors, tactile sensors, inductive sensors, resistive sensors, and capacitive sensors, can be used in conjunction with the cutting control unit 118 which cooperates with the support plate control and drive system 120 to move the support plate 112 and facilitate precise control and reproducibility in positioning the work piece 10. In operation, such as during the cutting operation, the output of each sensor is monitored so that process information, such as the position and orientation of the work piece, the cutting depth, the length of the cut, and the location of the cut is recorded to file every few milliseconds. The file may be indexed by the serial number of the work piece and may contain additional information such as the time and date of processing, an identification of the specific equipment used, and the operator ID in addition to the recorded work piece and cutting information.

Figure 4:
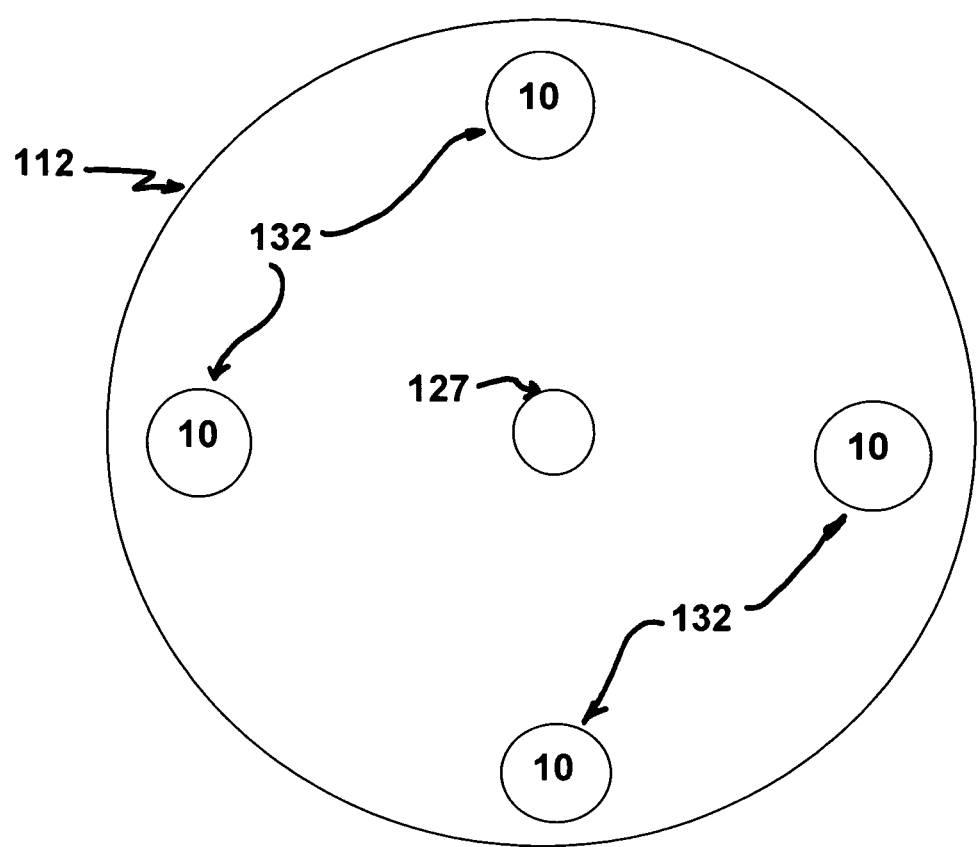
FIG. 4 is a schematic diagram showing a top view of the support plate of the view of the electric discharge machine of FIG. 1 mounted to a shaft and having a plurality of planetary supports for securing a plurality of corresponding work pieces on the support plate.

In another preferred embodiment of the invention, as shown in FIG. 4, the movable support plate 112 includes a plurality of planetary supports 132 for securing a plurality of corresponding work pieces 10 on the support plate 112. It should be understood that depending on the particular shape, size and cutting pattern being applied to the work piece 10, the planetary supports 132 may vary. For an illustrative example, as shown in FIG. 1, the planetary supports 132 may be in the form of one or more clamps that operate to clamp the work piece 10 in position on the movable support plate 112. It should be understood that various other supports, such as friction clamps, pins, and other such means may be utilized that are effective for securing a work piece in position on a support. It should now be understood to one skilled in the art that the use of planetary supports allows a plurality of work pieces to be placed on the movable support plate for processing thus allowing more than one work piece to be processed before an operator is required to remove the processed work pieces. Thus, the amount of time for processing can be greatly reduced. This is particularly true when the work pieces are relatively small such as parts often used in medical devices.

In a preferred embodiment of the invention sensors 130, as illustrated in FIGS. 2 and 3, continually communicates information to the cutting control unit 118 that using the system software 124 operates to transmit commands to the support plate control and drive system 120 for moving the work piece 10 during the cutting operation. Similarly, the sensors 130 which are in communication with the cutting control unit 118 can be used to measure the location and the length and depth of the cut made to the work piece 10. The measurements made by the cutting control unit 118 using information obtained by one or more of the sensors 130 are then compared to the measurements and preprogrammed parameters inputted by the operator using the input/output devices 126 of the computer system 122 and, if necessary, adjusts the movement of the support plate 112 and/or the cutting speed (power output generating the electric discharge), location and/or depth of the cutting process. Once developed, the process tolerances can be used as a metric to which the process information, such as the actual cut parameters can be compared and adjusted accordingly as a means of insuring that the work piece has been cut in accordance in the desired specifications. If the process information (cutting length, depth, location, etc.) has remained within the process tolerances of acceptable operating parameters, the operation is considered a success and the operator so notified. In the event that the process information falls outside of the pre-determined process tolerances, a failure is noted directly on the machine operator's computer output device and also written to an electronic file in the computer thereby permanently recording the failure.

Figure 5:
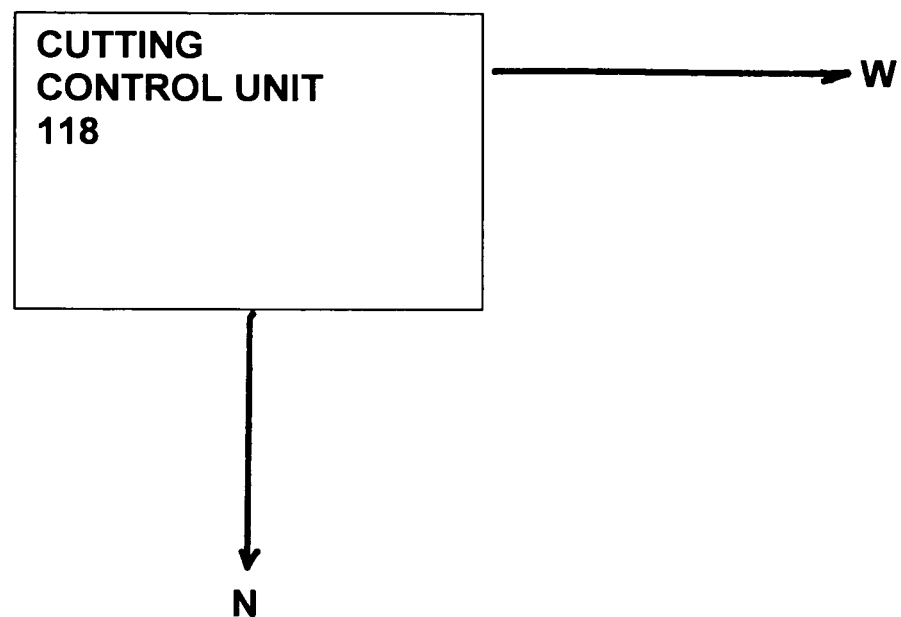
FIG. 5 is a schematic diagram of the electric discharge machine of FIG. 1 showing the relationship of the cutting and control unit, the Internet and a network.

As illustrated in FIG. 5, another preferred embodiment of the invention is shown whereby the cutting control unit 118 is connected to the World Wide Web (WVVW) W by any suitable connecting means including, but not limited to, cable or telephone modem, a wired network connection, or a wireless network connection. The connection of the cutting control unit 118 to the World Wide Web W facilitates remote diagnostic monitoring of equipment operation, data collection, upgrading of control software and remote process monitoring for maintenance, quality control and inventory control purposes. Information uploaded to the World Wide Web is accessible through a conventional secured web site requiring password and/or biometric authentication for login. It should also now be understood to one skilled in the art that the cutting control system could in another preferred embodiment be connected to a network N, such as an interoffice, whereby operators in remote locations of a facility can monitor and modify the cutting process.

Figure 6:
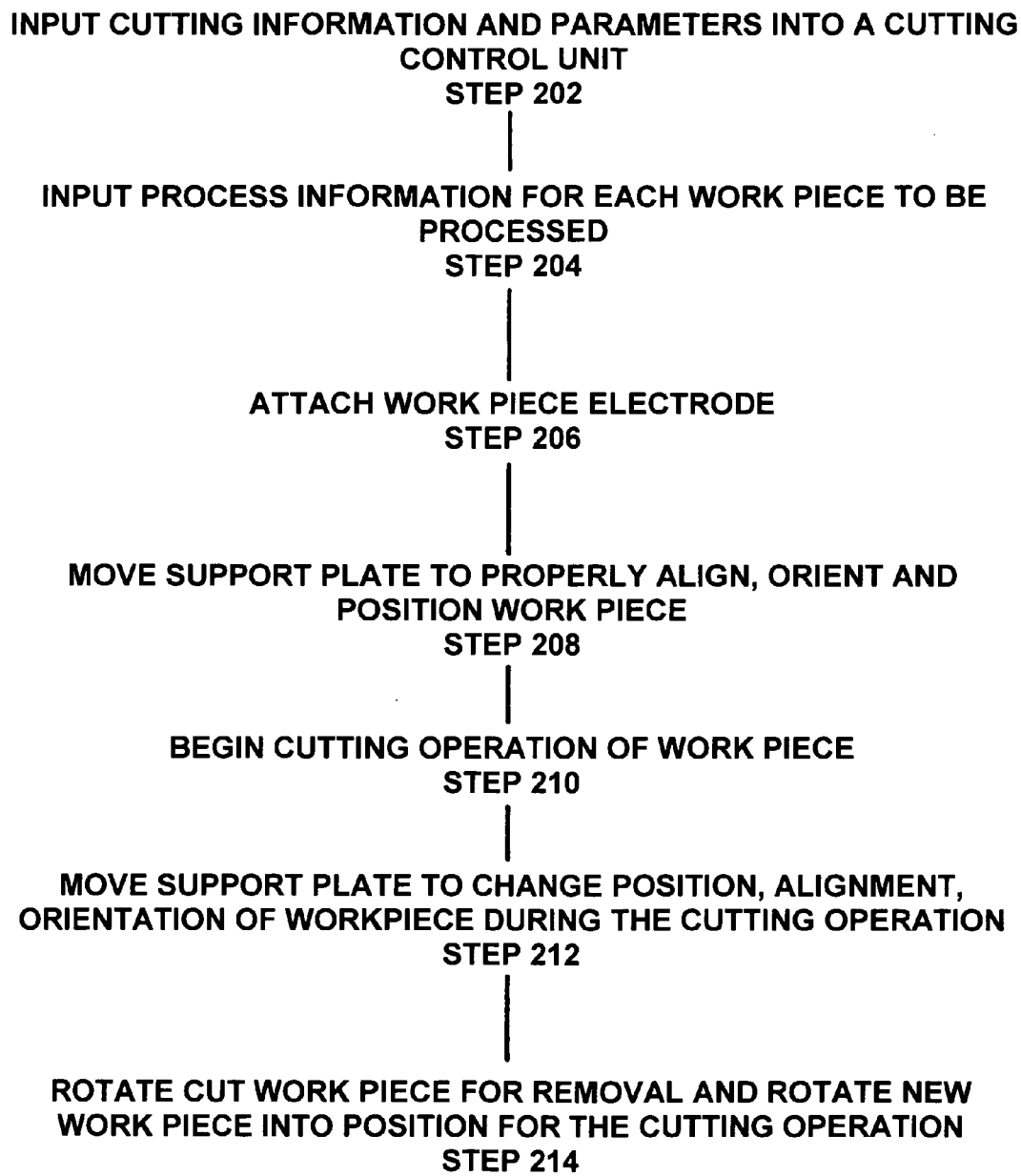
FIG. 6 is a flow diagram of the operation of the electric discharge machine of FIG. 1.

In operation, as shown in FIG. 6, the system software of the WEDM operates to request the operator to input cutting information and parameters into the cutting control unit (step 202) using the input/output device of the computer system. The operator then inputs such process information for each work piece to be treated including inputting identifying indicia, such as a serial number, unique to that work piece so that process information can be matched and maintained for each work piece (step 204). The operator places one or more work pieces onto the movable spool (step 206) and attaches the work piece electrode such that the it is electrically coupled to the work piece to create electrical communication with the work piece (step 206). After the control unit has been provided with instructions from the operator and the work piece electrode has been properly attached, the WEDM, under the direction of the system software, moves the support plate such that the work piece is in the proper orientation and positioned with respect to the wire electrode (step 208). Once the work piece is properly positioned, the WEDM begins cutting the work piece according to the instructions previously inputted into the cutting control unit (step 210). The control unit of the WEDM also operating under the instructions inputted by the operator communicates with the support plate control and drive system to rotate and/or raise or lower, and/or tilt the work piece such that the proper cuts can be made (step 212). It should be appreciated by moving the work piece into various positions allows precise cutting to be made without the need for the cutting wire to be repositioned. It should also be appreciated by one skilled in the art that the movable support plate under control of the cutting control unit cooperating with the support plate control and drive system can further operate to rotate during the cutting process such that the work piece rotates during cutting to produce various intricate geometric cuts. After the final cut has been made, the work piece is then rotated out of position for removal by the operator (step 214). In another preferred embodiment of the invention, when the work piece that has just been cut is rotated out of position and a new work piece is rotated into position for processing (step 214).

Figure 7A:
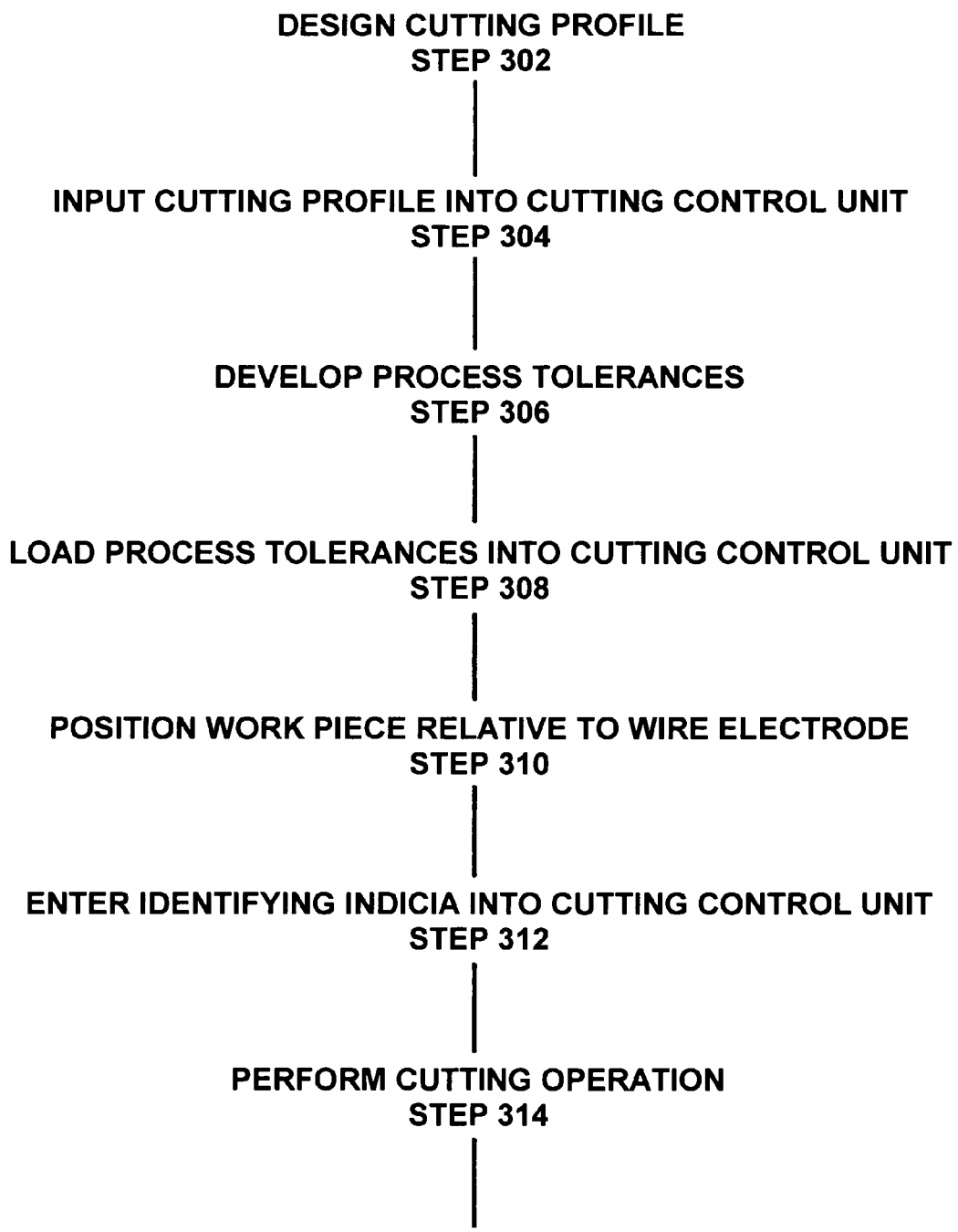
Figure 7C:
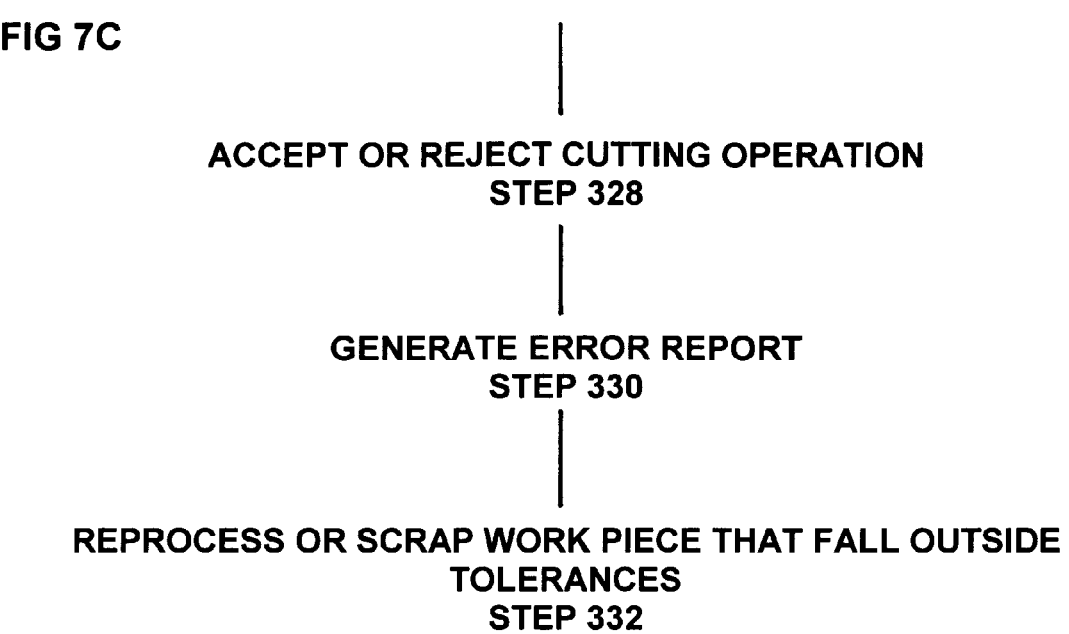

In another embodiment, the sensors 130 provide signals to the cutting control unit 118 which registers the precise position and orientation of the work piece 10 being processed as well as the cut that was performed by the WEDM 100. Referring to FIG. 7, an illustrative example of the quality control process of the WEDM of the subject invention is carried out in the following manner. A cutting profile to be cut in the work piece is designed (step 302). This profile includes the depth and the direction of the cut(s) to be performed at a location or various locations of the work piece and the appropriate information is inputted into the cutting control unit necessary to impart the desired cuts along the work piece (step 304). Process tolerances are also developed based on the empirical data to establish a range of target values for the operating parameters that will ensure that the part is cut within the desired tolerances (step 306). The process tolerances may also take into account additional factors such as the nature of the application, the condition and nature of the workpiece, and the cost of the part being treated. The system software (CNC code) receives the operating parameters and process tolerances for the cutting of the work piece 110 (step 308).

The quality control method of the current invention is carried out in a series of steps. In a first step a work piece to be treated is positioned relative to the wire electrode (step 310). In a next step, the operator enters the serial number of the work piece to be treated or other identifying indicia into the cutting control unit along with a unique operator ID (step 312). The identifying indicia may be manually entered or scanned in as through a bar code reader or other machine vision apparatus. Preferably, the date, time, software version and the unique machine ID are automatically written to file along with the information entered by the operator. In a third step, the cutting operation is initiated by running the previously developed system software (step 314). Throughout the cutting operation the cutting control unit continuously monitors process information as the wire electrode operates to cut the work piece in a pre-programmed pattern (step 316). The process information, which is received by and stored in memory in the cutting control unit is processed and compared to the empirically developed operating parameters and process tolerances associated with the desired cutting profile (step 318). The cutting control unit cooperates with the support plate control and drive system and dynamically adjusts the work piece position and orientation to compensate for deviations from the empirically developed operating parameters such that they fall within the process tolerances (step 320). The cutting control unit operates as a closed looped feedback control that allows the cutting operation to be continuously monitored and adjusted thereby producing a high degree of agreement between the cutting pattern and the designed cutting profile.

Following the cutting operation, the cutting control unit compares the process information recorded during the cutting operation to the previously developed operating parameters and process tolerances (step 322). Any deviations that remained beyond (outside) the bounds of the process tolerances are identified and the location of such deviations relative to the surface of the work piece is determined (step 324). The cutting control unit operates to indicate the success or failure of the cutting process to the operator (step 326). Where no deviations or only acceptable deviations have occurred, the cutting control unit indicates to the operator that the cutting operation has been successful or if unacceptable deviations have occurred, the cutting control unit indicates to the operator that the cutting operation has not been successful (step 328). The cutting control unit then generates an error report containing the serial number of the workpiece and the deviations beyond (outside) the acceptable process tolerances (step 330). At this point, depending on the nature of the application, the operator may elect to reprocess the workpiece in an attempt to remedy any processing deviations or otherwise scrap the work piece (step 332).

The method of the current invention also affords the following additional benefits. It should not be apparent to one skilled in the art that the link connecting the cutting control unit 118 to the World Wide Web W or other network allows the cutting operation to be remotely monitored in real time. Data generated from each cutting operation, indexed by the workpiece serial number, can be easily uploaded to a specified location, analyzed and distributed. Data related to the operation of the WEDM equipment such as the amount of operations performed and the wire feed, and other operational information can be remotely analyzed for purposes including equipment maintenance and diagnostics as well for tracking machine usage. Accordingly, by monitoring the operational information, a diagnostic tool can be generated for maintenance of the WEDM so that deviation from normal equipment operation can be identified and remedied through the use of statistical process control and other means of analyzing the process information collected. Finally, such a connection facilitates the upgrading of control and diagnostic software from a remote location.

While the system and method described herein constitutes preferred embodiments of the invention, it is to be understood that the invention is not limited to the precise system and method and that changes may be made therein without departing from the scope of the invention.

Although the foregoing invention has been described in some detail for purposes of clarity of understandings, it will be apparent that certain changes and modifications may be practiced within the scope of the appended claims. Accordingly, it should be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

I claim:

1. A wire electric discharge machine for performing a cutting operation to a work piece comprising:
   a wire electrode;
   a work piece electrode;

a support plate for supporting more than one work piece and for placing each work piece in position for cutting and wherein said support plate is made from an electrical conducting metal and said work piece electrode is electrically connected to said support plate a cutting control unit;

wherein said cutting control is operable to control the movement of said support plate; and wherein said support plate is operable to raise or lower, tilt, and rotate the work piece during the cutting operation.

2. The wire electric discharge machine of claim 1 wherein said cutting control unit comprises system software that is operable to move said support plate to place the work piece in position for the cutting operation.

3. The wire electric discharge machine of claim 1 wherein said support plate is attached to a shaft that is operable to move said support plate to place the work piece in position for the cutting operation or to move the work piece during the cutting operation.

4. The wire electric discharge machine of claim 1 wherein the cutting control unit is operable to record process information concerning the cutting operation.

5. The wire electric discharge machine of claim 1 wherein said support plate comprises a plurality of planetary supports for securing a plurality of corresponding work pieces on said support plate.

6. The wire electric discharge machine of claim 1 wherein said cutting control unit is operable to compare measurements of a cut made to the work piece by the wire electric discharge machine during a cutting operation with preprogrammed parameters and tolerances and further is operable to make any adjustment to the cutting operation and position of the work piece to insure that the work piece is cut in accordance with said preprogrammed parameters and tolerances.

7. The wire electric discharge machine of claim 1 wherein said cutting control unit is connected to a network for allowing remote monitoring and modifications to be made to the cutting operation.

8. A method of performing a cutting operation on one or more work pieces using a wire electric discharge machine, the cutting operation comprising the steps of:

inputting cutting information and parameters into a cutting control unit;

inputting process information for each work piece into the cutting control unit;

placing one or more work pieces onto a support plate;

attaching a work piece electrode to one or more work pieces such that the one or more work pieces to be processed are electrically connected to the work piece electrode;

moving the support plate to align, orient, and position one of the one or more work pieces for the cutting operation;

begin the cutting operation on the work piece;

moving the support plate to change the alignment and orientation of the work piece during the cutting operation;

rotate the work piece for removal from the support plate and rotate a another one of the one or more work pieces into position for the cutting operation.

9. A method for performing a cutting operation on one or more work pieces using a wire electric discharge machine, the cutting operation comprising the steps of:

designing a cutting profile;

inputting the cutting profile into a cutting control unit;

developing process tolerances;

loading the process tolerances into the cutting control unit;

positioning one of the one or more work pieces in position relative to a wire electrode;

entering identifying indicia of the one work piece into the cutting control unit;

performing a cutting operation on the one work piece;

monitoring the process information relating to the cutting operation;

comparing the process information with the designed cutting profile and process tolerances and identify any deviations;

adjusting the work piece position and orientation to compensate for deviations;

continuing performing the cutting operations; and identifying and recording any deviations that remain outside the process tolerances.

* * * * *